(12) United States Patent
Chuang et al.

(10) Patent No.: US 8,997,494 B2
(45) Date of Patent: Apr. 7, 2015

(54) GAS TURBINE ENGINE FAN BLADE AIRFOIL PROFILE

(71) Applicant: United Technologies Corporation, Hartford, CT (US)

(72) Inventors: Sue-Li Chuang, Glastonbury, CT (US); Yuan Dong, Glastonbury, CT (US); Sanjay S. Hingorani, Johns Creek, GA (US); Dilip Prasad, Newbury Park, CA (US)

(73) Assignee: United Technologies Corporation, Hartford, CT (US)

( * ) Notice: Subject to any disclaimer, the term of this patent is extended or adjusted under 35 U.S.C. 154(b) by 346 days.

(21) Appl. No.: 13/664,647

(22) Filed: Oct. 31, 2012

(65) Prior Publication Data

US 2014/0311149 A1    Oct. 23, 2014

Related U.S. Application Data

(60) Provisional application No. 61/706,859, filed on Sep. 28, 2012.

(51) Int. Cl.
| | |
|---|---|
| F02C 1/00 | (2006.01) |
| F02G 3/00 | (2006.01) |
| F04D 29/38 | (2006.01) |
| F01D 5/14 | (2006.01) |

(52) U.S. Cl.
CPC .............. F04D 29/384 (2013.01); F01D 5/141 (2013.01); *F05D 2220/36* (2013.01); *F05D 2250/74* (2013.01)

(58) Field of Classification Search
USPC ............ 60/722, 726, 226.3, 226.1; 244/53 B; 137/15.1, 15.2
See application file for complete search history.

(56) References Cited

U.S. PATENT DOCUMENTS

| | | | | |
|---|---|---|---|---|
| 5,201,801 | A | * | 4/1993 | Smith, Jr. ...................... 60/226.1 |
| 6,004,101 | A | * | 12/1999 | Schilling et al. .............. 416/224 |
| 7,581,930 | B2 | | 9/2009 | Aggarwala et al. |
| 2008/0273984 | A1 | | 11/2008 | Laing et al. |
| 2011/0056183 | A1 | * | 3/2011 | Sankrithi et al. ................ 60/204 |
| 2012/0057981 | A1 | * | 3/2012 | Nash et al. ................ 416/223 A |
| 2013/0111907 | A1 | * | 5/2013 | Murdock ........................ 60/726 |
| 2013/0340406 | A1 | * | 12/2013 | Gallagher et al. .............. 60/204 |

FOREIGN PATENT DOCUMENTS

CN    201016345    2/2008

OTHER PUBLICATIONS

International Search Report and Written Opinion for PCT Application No. PCT/US2013/061123 mailed Jun. 24, 2014.

\* cited by examiner

*Primary Examiner* — Craig Kim
(74) *Attorney, Agent, or Firm* — Carlson, Gaskey & Olds, P.C.

(57) ABSTRACT

A fan blade for a gas turbine engine includes an airfoil that includes leading and trailing edges joined by pressure and suction sides to provide an exterior airfoil surface that extends in a radial direction to a tip. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord. A circumferential coordinate is scaled by the local axial chord, and a span location. The local axial chord corresponds to a width of the airfoil between the leading and trailing edges at the span location.

12 Claims, 3 Drawing Sheets

GAS TURBINE ENGINE FAN BLADE AIRFOIL PROFILE

This application claims priority to U.S. Application No. 61/706,859, which was filed on Sep. 28, 2012.

BACKGROUND

This disclosure relates to a gas turbine engine, and more particularly to a fan blade airfoil that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

One type of gas turbine engine incorporates a fan section driven by low pressure turbine to provide a high bypass ratio in which a significant amount of thrust is provided by the fan section through a bypass flow path. Some gas turbine engines may also use a fan drive gear system to reduce the speed of the fan section. As a result, significantly larger fan blades may be used in the fan section.

A leading edge of each fan blade is designed to align with the flow angle of air entering the bypass flow path at the fan blade's design point to minimize performance loss in the fan section. The incidence angle between the flow and the leading edge at the design point is typically optimized to provide an adequate stall margin as well as flow capacity.

SUMMARY

In one exemplary embodiment, a fan blade for a gas turbine engine includes an airfoil that includes leading and trailing edges joined by pressure and suction sides to provide an exterior airfoil surface that extends in a radial direction to a tip. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord. A circumferential coordinate is scaled by the local axial chord, and a span location. The local axial chord corresponds to a width of the airfoil between the leading and trailing edges at the span location.

In a further embodiment of any of the above, the airfoil includes an aluminum fan blade.

In a further embodiment of any of the above, the span locations correspond to a position from a rotational axis of the airfoil in a numerical sequence indicated in Table 1 with the last position closest to the tip.

In a further embodiment of any of the above, the Cartesian coordinates in Table 1 have a tolerance relative to the specified coordinates of ±0.050 inches (±1.27 mm).

In one exemplary embodiment, a gas turbine engine includes a compressor section. A combustor is fluidly connected to the compressor section. A turbine section is fluidly connected to the combustor. The turbine section includes a high pressure turbine coupled to the high pressure compressor via a shaft and a low pressure turbine. A fan section is operatively coupled to the turbine section. The fan section includes an array of fan blade. At least one fan blade includes an airfoil that has leading and trailing edges joined by pressure and suction sides to provide an exterior airfoil surface extending from in a radial direction to a tip. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord. A circumferential coordinate is scaled by the local axial chord, and a span location. The local axial chord corresponds to a width of the airfoil between the leading and trailing edges at the span location.

In a further embodiment of any of the above, the airfoil includes an aluminum fan blade.

In a further embodiment of any of the above, the span locations correspond to a position from a rotational axis of the airfoil in a numerical sequence indicated in Table 1 with the last position closest to the tip.

In a further embodiment of any of the above, the Cartesian coordinates in Table 1 have a tolerance relative to the specified coordinates of ±0.050 inches (±1.27 mm).

In a further embodiment of any of the above, the array of fan blades includes less than about twenty-six (26) fan blades.

In a further embodiment of any of the above, the array of fan blades includes less than about twenty (20) fan blades.

In a further embodiment of any of the above, the fan section is driven by a geared architecture.

In a further embodiment of any of the above, the gas turbine engine is a high-bypass geared gas turbine engine.

BRIEF DESCRIPTION OF THE DRAWINGS

The disclosure can be further understood by reference to the following detailed description when considered in connection with the accompanying drawings wherein.

DETAILED DESCRIPTION

Figure 1:
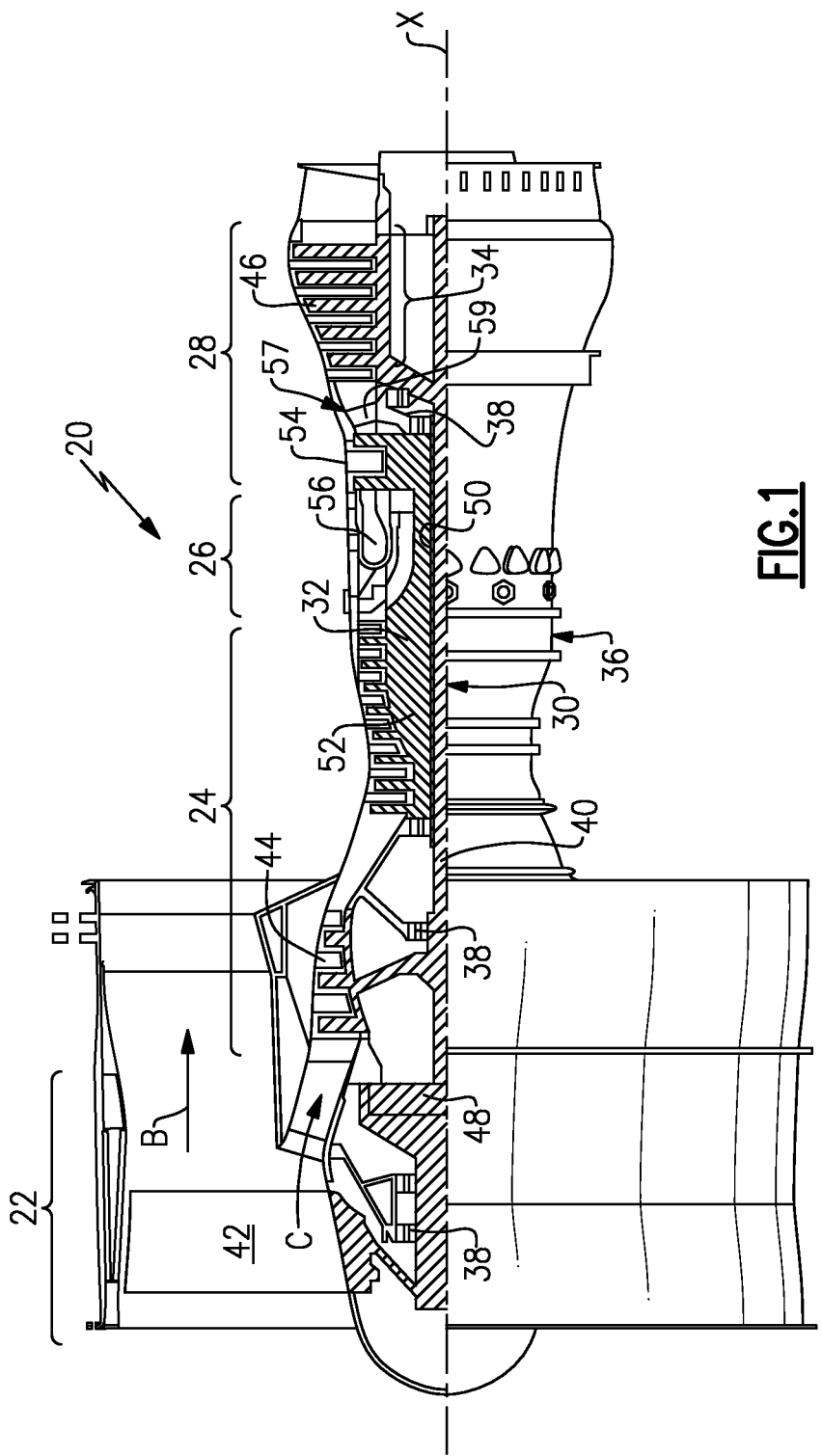
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades.

Figure 2:
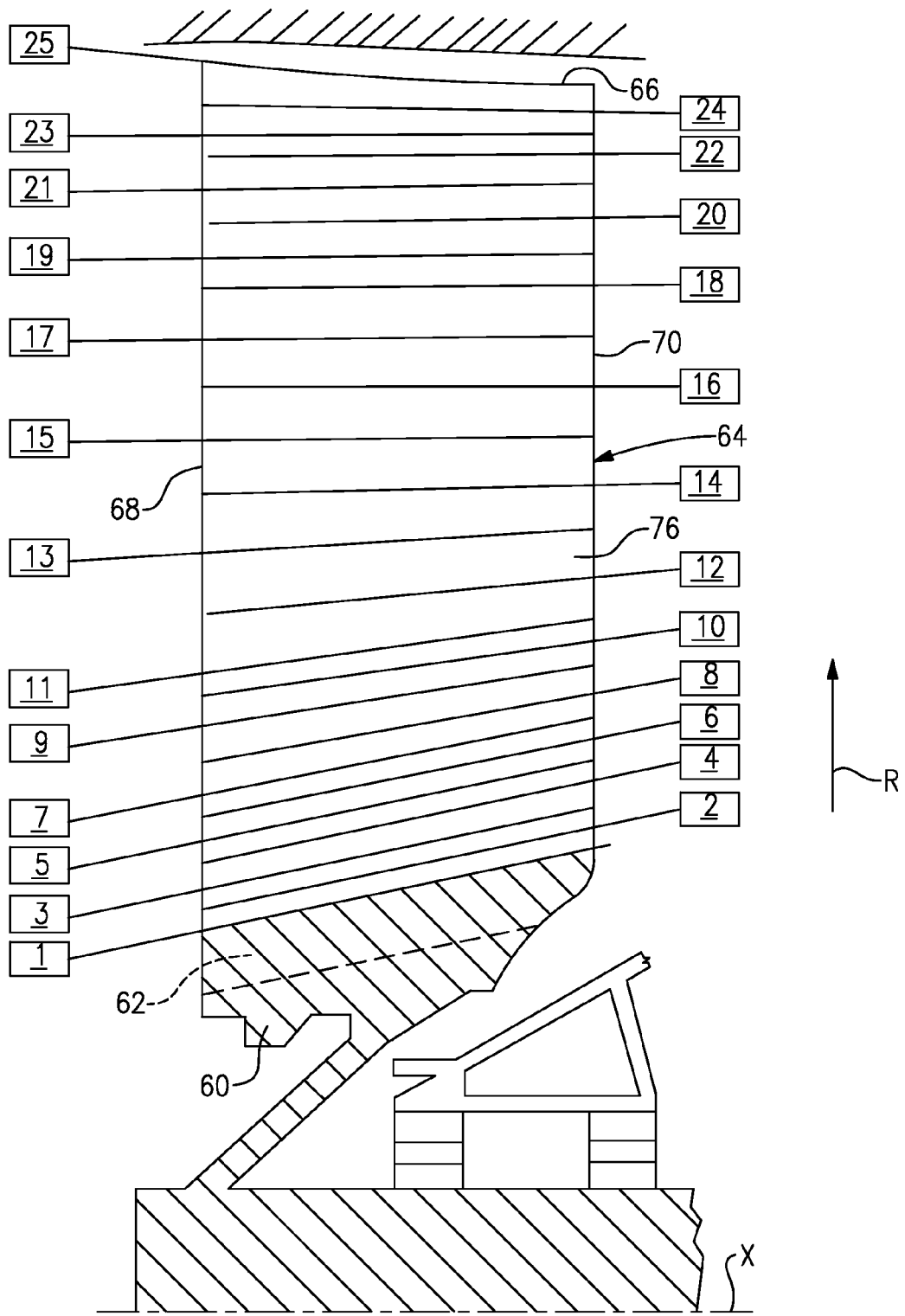
FIG. 2 is a plane view of the fan blade airfoil illustrating directional references with the span positions and local axial chords referenced in Table 1.

Referring to FIG. 2, the fan blade 42 is supported by a fan hub 60 that is rotatable about the axis X. Each fan blade 42 includes an airfoil 64 extending in a radial span direction R from a root 62 to a tip 66. The root 62 is received in a correspondingly shaped slot in the fan hub 60 as is known. The airfoil 64 extends radially outward of a platform, which provides the inner flow path. The platform may be integral with the fan blade or separately secured to the fan hub, for example.

Figure 3:
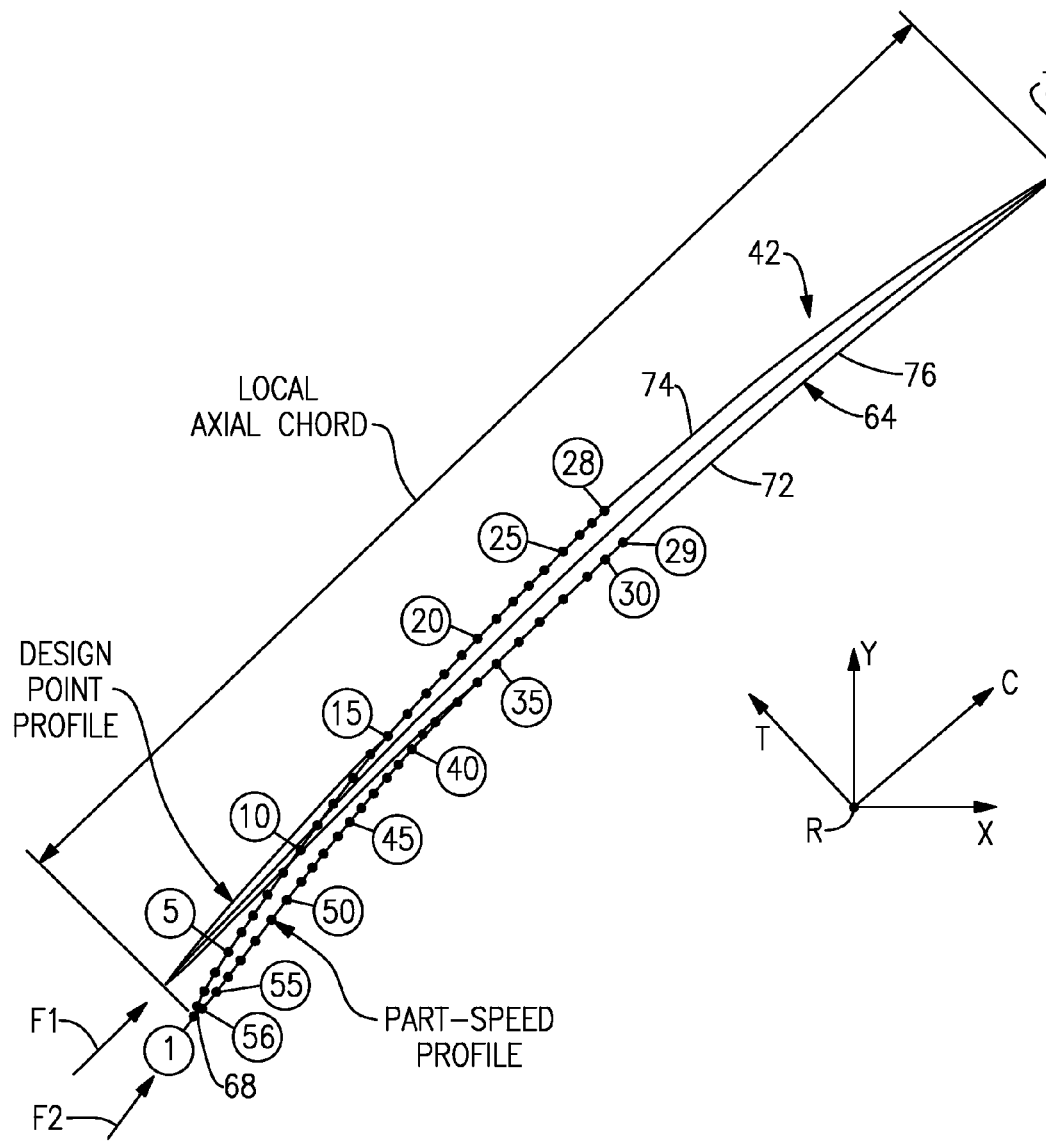
FIG. 3 is a cross-sectional view through the fan blade airfoil illustrating the location of data points and the leading edge portion of the fan blade airfoil.

The airfoil 64 has an exterior surface 76 providing a contour that extends from a leading edge 68 aftward in a chordwise direction C to a trailing edge 70, as shown in FIG. 3. Pressure and suction sides 72, 74 join one another at the leading and trailing edges 68, 70 and are spaced apart from one another in an airfoil thickness direction T. An array of the fan blades 42 are positioned about the axis X in a circumferential direction Y.

The exterior surface 76 of the airfoil 64 generates lift based upon its geometry and directs flow along the core flow path C. The fan blades 42 may be constructed from an aluminum alloy, titanium alloy and/or composite material. Abrasion-resistant coatings or other protective coatings may be applied to the fan blade 42.

With continuing reference to FIG. 3, a "design point profile" is illustrated, which represents an existing fan blade profile. At part speed engine operating conditions along the engine operating line, the flow incidence angle increases from F1 to F2. The flow can easily separate locally near the leading edge 68 at the flow incidence angle F2 during part speed conditions. To improve flutter margin and reduce noise during take-off, cutback and approach flight conditions, the design point profile of the leading edge portion of the fan blade 42 was locally changed to the "part-speed profile."

In one example, the fan blade 42 is aluminum and is provided with the design point profile. The fan blade 42 is plastically deformed, by die stamping, for example, to change the exterior surface of the fan blade 42 from the design point profile to the part-speed profile. In this manner, a new airfoil geometry may be provided while preserving the material of the originally designed blade.

The geometry of the airfoil 64 are described in terms of Cartesian coordinates defined along X, Y and R axes, which respectively correspond to the axial (X), circumferential (Y) and radial (span) R directions shown in FIGS. 2 and 3. The span coordinate is provided as a radial location (boxed numbers in FIG. 2) from the rotational axis X of the fan blade 42. The axial (X) and circumferential (Y) coordinates are normalized by the local axial chord, which is the width of the airfoil 64 from the leading edge 68 to the trailing edge 70 for the given section. The general location of the coordinates are shown by the points illustrated in FIG. 3 (some of which have been indicated by circled numbers).

The contour of the airfoil 78 is set forth in Table 1, which provides the axial (X), circumferential (Y) coordinates (in inches) and span coordinates. The axial and circumferential coordinates can be converted to metric (mm) by multiplying by 25.4. Three dimensional airfoil surfaces are formed by joining adjacent points in Table 1 in a smooth manner and joining adjacent sections or sectional profiles along the span. The manufacturing tolerance relative to the specified coordinates is ±0.050 inches (±1.27 mm). The coordinates define points on a cold, uncoated, stationary airfoil surface, in a plane at 0% span. Additional elements such as cooling holes, protective coatings, fillets and seal structures may also be formed onto the specified airfoil surface, or onto an adjacent platform surface, but these elements are not necessarily described by the normalized coordinates. For example, a variable coating may be applied between 0.0001 inch (0.003 mm) (trace) and 0.010 inch (0.25 mm) thick.

TABLE 1

| | | |
|---|---|---|
| Section 1 | | |
| 1 | 0.0000 | −0.1051 |
| 2 | −0.0001 | −0.1040 |
| 3 | 0.0003 | −0.1031 |
| 4 | 0.0007 | −0.1026 |
| 5 | 0.0011 | −0.1021 |
| 6 | 0.0016 | −0.1017 |
| 7 | 0.0022 | −0.1010 |
| 8 | 0.0034 | −0.1000 |
| 9 | 0.0054 | −0.0983 |
| 10 | 0.0083 | −0.0960 |
| 11 | 0.0120 | −0.0932 |
| 12 | 0.0175 | −0.0893 |
| 13 | 0.0248 | −0.0842 |
| 14 | 0.0339 | −0.0782 |
| 15 | 0.0458 | −0.0706 |
| 16 | 0.0605 | −0.0616 |
| 17 | 0.0790 | −0.0508 |
| 18 | 0.1015 | −0.0386 |
| 19 | 0.1282 | −0.0254 |
| 20 | 0.1588 | −0.0117 |
| 21 | 0.1919 | 0.0014 |
| 22 | 0.2271 | 0.0134 |
| 23 | 0.2628 | 0.0237 |
| 24 | 0.2989 | 0.0322 |
| 25 | 0.3354 | 0.0391 |
| 26 | 0.3722 | 0.0442 |
| 27 | 0.4092 | 0.0475 |
| 28 | 0.4462 | 0.0493 |
| 29 | 0.4917 | −0.0531 |
| 30 | 0.4561 | −0.0532 |
| 31 | 0.4205 | −0.0532 |
| 32 | 0.3849 | −0.0537 |
| 33 | 0.3493 | −0.0548 |
| 34 | 0.3138 | −0.0567 |
| 35 | 0.2783 | −0.0594 |
| 36 | 0.2430 | −0.0628 |
| 37 | 0.2076 | −0.0669 |
| 38 | 0.1739 | −0.0715 |
| 39 | 0.1423 | −0.0765 |
| 40 | 0.1142 | −0.0814 |
| 41 | 0.0901 | −0.0861 |
| 42 | 0.0701 | −0.0902 |
| 43 | 0.0540 | −0.0939 |
| 44 | 0.0409 | −0.0970 |
| 45 | 0.0307 | −0.0995 |
| 46 | 0.0225 | −0.1016 |
| 47 | 0.0162 | −0.1032 |
| 48 | 0.0118 | −0.1042 |
| 49 | 0.0084 | −0.1050 |
| 50 | 0.0059 | −0.1055 |
| 51 | 0.0045 | −0.1058 |
| 52 | 0.0036 | −0.1059 |
| 53 | 0.0030 | −0.1060 |
| 54 | 0.0024 | −0.1060 |
| 55 | 0.0018 | −0.1060 |
| 56 | 0.0008 | −0.1058 |
| Section 2 | | |
| 1 | 0.0000 | −0.1216 |
| 2 | −0.0002 | −0.1205 |
| 3 | 0.0003 | −0.1196 |
| 4 | 0.0007 | −0.1191 |
| 5 | 0.0010 | −0.1186 |
| 6 | 0.0015 | −0.1181 |
| 7 | 0.0021 | −0.1175 |
| 8 | 0.0032 | −0.1164 |
| 9 | 0.0052 | −0.1147 |
| 10 | 0.0080 | −0.1123 |
| 11 | 0.0117 | −0.1094 |
| 12 | 0.0171 | −0.1054 |
| 13 | 0.0242 | −0.1002 |
| 14 | 0.0332 | −0.0939 |
| 15 | 0.0448 | −0.0860 |
| 16 | 0.0593 | −0.0767 |
| 17 | 0.0776 | −0.0656 |
| 18 | 0.0998 | −0.0530 |
| 19 | 0.1262 | −0.0392 |
| 20 | 0.1564 | −0.0249 |
| 21 | 0.1892 | −0.0110 |
| 22 | 0.2240 | 0.0019 |
| 23 | 0.2594 | 0.0132 |
| 24 | 0.2952 | 0.0229 |
| 25 | 0.3314 | 0.0310 |
| 26 | 0.3680 | 0.0374 |
| 27 | 0.4048 | 0.0422 |
| 28 | 0.4417 | 0.0459 |
| 29 | 0.4909 | −0.0506 |
| 30 | 0.4553 | −0.0525 |
| 31 | 0.4196 | −0.0544 |
| 32 | 0.3840 | −0.0563 |
| 33 | 0.3484 | −0.0589 |
| 34 | 0.3129 | −0.0622 |
| 35 | 0.2774 | −0.0661 |
| 36 | 0.2420 | −0.0708 |
| 37 | 0.2068 | −0.0762 |
| 38 | 0.1731 | −0.0819 |
| 39 | 0.1416 | −0.0880 |
| 40 | 0.1136 | −0.0938 |
| 41 | 0.0896 | −0.0992 |
| 42 | 0.0696 | −0.1040 |
| 43 | 0.0536 | −0.1082 |
| 44 | 0.0406 | −0.1119 |
| 45 | 0.0305 | −0.1148 |
| 46 | 0.0223 | −0.1172 |
| 47 | 0.0161 | −0.1190 |
| 48 | 0.0118 | −0.1203 |
| 49 | 0.0084 | −0.1212 |
| 50 | 0.0059 | −0.1218 |
| 51 | 0.0045 | −0.1221 |
| 52 | 0.0036 | −0.1223 |
| 53 | 0.0030 | −0.1223 |
| 54 | 0.0024 | −0.1224 |
| 55 | 0.0018 | −0.1224 |
| 56 | 0.0008 | −0.1223 |
| Section 3 | | |
| 1 | 0.0000 | −0.1393 |
| 2 | −0.0002 | −0.1382 |
| 3 | 0.0002 | −0.1373 |
| 4 | 0.0006 | −0.1368 |

TABLE 1-continued

| | | |
|---|---|---|
| 5 | 0.0010 | −0.1363 |
| 6 | 0.0014 | −0.1358 |
| 7 | 0.0020 | −0.1352 |
| 8 | 0.0031 | −0.1341 |
| 9 | 0.0050 | −0.1323 |
| 10 | 0.0078 | −0.1299 |
| 11 | 0.0114 | −0.1269 |
| 12 | 0.0167 | −0.1228 |
| 13 | 0.0238 | −0.1174 |
| 14 | 0.0326 | −0.1110 |
| 15 | 0.0441 | −0.1030 |
| 16 | 0.0585 | −0.0934 |
| 17 | 0.0765 | −0.0820 |
| 18 | 0.0986 | −0.0690 |
| 19 | 0.1247 | −0.0547 |
| 20 | 0.1547 | −0.0397 |
| 21 | 0.1871 | −0.0251 |
| 22 | 0.2216 | −0.0113 |
| 23 | 0.2567 | 0.0010 |
| 24 | 0.2923 | 0.0118 |
| 25 | 0.3283 | 0.0211 |
| 26 | 0.3646 | 0.0288 |
| 27 | 0.4012 | 0.0351 |
| 28 | 0.4380 | 0.0406 |
| 29 | 0.4901 | −0.0486 |
| 30 | 0.4544 | −0.0521 |
| 31 | 0.4187 | −0.0556 |
| 32 | 0.3830 | −0.0592 |
| 33 | 0.3474 | −0.0630 |
| 34 | 0.3118 | −0.0676 |
| 35 | 0.2763 | −0.0729 |
| 36 | 0.2410 | −0.0789 |
| 37 | 0.2058 | −0.0856 |
| 38 | 0.1722 | −0.0926 |
| 39 | 0.1407 | −0.0998 |
| 40 | 0.1128 | −0.1067 |
| 41 | 0.0889 | −0.1130 |
| 42 | 0.0691 | −0.1187 |
| 43 | 0.0532 | −0.1236 |
| 44 | 0.0403 | −0.1278 |
| 45 | 0.0303 | −0.1311 |
| 46 | 0.0222 | −0.1339 |
| 47 | 0.0160 | −0.1361 |
| 48 | 0.0117 | −0.1375 |
| 49 | 0.0083 | −0.1386 |
| 50 | 0.0059 | −0.1393 |
| 51 | 0.0045 | −0.1396 |
| 52 | 0.0036 | −0.1398 |
| 53 | 0.0030 | −0.1399 |
| 54 | 0.0024 | −0.1400 |
| 55 | 0.0018 | −0.1401 |
| 56 | 0.0008 | −0.1399 |
| Section 4 | | |
| 1 | 0.0000 | −0.1581 |
| 2 | −0.0002 | −0.1571 |
| 3 | 0.0002 | −0.1562 |
| 4 | 0.0005 | −0.1556 |
| 5 | 0.0009 | −0.1551 |
| 6 | 0.0013 | −0.1547 |
| 7 | 0.0019 | −0.1540 |
| 8 | 0.0030 | −0.1528 |
| 9 | 0.0049 | −0.1510 |
| 10 | 0.0076 | −0.1486 |
| 11 | 0.0112 | −0.1456 |
| 12 | 0.0165 | −0.1413 |
| 13 | 0.0235 | −0.1359 |
| 14 | 0.0323 | −0.1294 |
| 15 | 0.0437 | −0.1211 |
| 16 | 0.0579 | −0.1114 |
| 17 | 0.0759 | −0.0997 |
| 18 | 0.0977 | −0.0863 |
| 19 | 0.1237 | −0.0716 |
| 20 | 0.1534 | −0.0560 |
| 21 | 0.1856 | −0.0407 |
| 22 | 0.2199 | −0.0260 |
| 23 | 0.2547 | −0.0128 |
| 24 | 0.2900 | −0.0009 |
| 25 | 0.3258 | 0.0095 |
| 26 | 0.3620 | 0.0185 |
| 27 | 0.3984 | 0.0264 |
| 28 | 0.4350 | 0.0335 |
| 29 | 0.4892 | −0.0467 |
| 30 | 0.4535 | −0.0520 |
| 31 | 0.4177 | −0.0573 |
| 32 | 0.3820 | −0.0626 |
| 33 | 0.3463 | −0.0681 |
| 34 | 0.3107 | −0.0742 |
| 35 | 0.2753 | −0.0810 |
| 36 | 0.2400 | −0.0884 |
| 37 | 0.2048 | −0.0965 |
| 38 | 0.1713 | −0.1049 |
| 39 | 0.1400 | −0.1133 |
| 40 | 0.1122 | −0.1212 |
| 41 | 0.0884 | −0.1284 |
| 42 | 0.0686 | −0.1348 |
| 43 | 0.0529 | −0.1403 |
| 44 | 0.0400 | −0.1450 |
| 45 | 0.0301 | −0.1488 |
| 46 | 0.0221 | −0.1519 |
| 47 | 0.0159 | −0.1543 |
| 48 | 0.0117 | −0.1559 |
| 49 | 0.0083 | −0.1571 |
| 50 | 0.0059 | −0.1579 |
| 51 | 0.0045 | −0.1583 |
| 52 | 0.0036 | −0.1585 |
| 53 | 0.0030 | −0.1587 |
| 54 | 0.0024 | −0.1588 |
| 55 | 0.0018 | −0.1588 |
| 56 | 0.0008 | −0.1587 |
| Section 5 | | |
| 1 | 0.0000 | −0.1774 |
| 2 | −0.0002 | −0.1765 |
| 3 | 0.0001 | −0.1755 |
| 4 | 0.0005 | −0.1750 |
| 5 | 0.0008 | −0.1745 |
| 6 | 0.0012 | −0.1740 |
| 7 | 0.0018 | −0.1733 |
| 8 | 0.0029 | −0.1722 |
| 9 | 0.0048 | −0.1703 |
| 10 | 0.0075 | −0.1679 |
| 11 | 0.0110 | −0.1648 |
| 12 | 0.0163 | −0.1605 |
| 13 | 0.0233 | −0.1550 |
| 14 | 0.0320 | −0.1484 |
| 15 | 0.0434 | −0.1400 |
| 16 | 0.0576 | −0.1301 |
| 17 | 0.0755 | −0.1182 |
| 18 | 0.0972 | −0.1045 |
| 19 | 0.1231 | −0.0893 |
| 20 | 0.1526 | −0.0732 |
| 21 | 0.1846 | −0.0572 |
| 22 | 0.2186 | −0.0417 |
| 23 | 0.2532 | −0.0275 |
| 24 | 0.2884 | −0.0146 |
| 25 | 0.3240 | −0.0032 |
| 26 | 0.3600 | 0.0071 |
| 27 | 0.3962 | 0.0166 |
| 28 | 0.4326 | 0.0251 |
| 29 | 0.4879 | −0.0459 |
| 30 | 0.4522 | −0.0527 |
| 31 | 0.4164 | −0.0596 |
| 32 | 0.3807 | −0.0666 |
| 33 | 0.3450 | −0.0737 |
| 34 | 0.3095 | −0.0812 |
| 35 | 0.2741 | −0.0894 |
| 36 | 0.2388 | −0.0982 |
| 37 | 0.2037 | −0.1077 |
| 38 | 0.1703 | −0.1174 |
| 39 | 0.1391 | −0.1271 |
| 40 | 0.1114 | −0.1361 |
| 41 | 0.0878 | −0.1442 |
| 42 | 0.0681 | −0.1515 |
| 43 | 0.0524 | −0.1576 |
| 44 | 0.0397 | −0.1629 |
| 45 | 0.0299 | −0.1671 |
| 46 | 0.0219 | −0.1705 |
| 47 | 0.0159 | −0.1731 |
| 48 | 0.0116 | −0.1749 |

TABLE 1-continued

| | | |
|---|---|---|
| 49 | 0.0083 | −0.1762 |
| 50 | 0.0059 | −0.1771 |
| 51 | 0.0045 | −0.1775 |
| 52 | 0.0036 | −0.1778 |
| 53 | 0.0030 | −0.1779 |
| 54 | 0.0024 | −0.1780 |
| 55 | 0.0018 | −0.1781 |
| 56 | 0.0008 | −0.1781 |
| Section 6 | | |
| 1 | 0.0000 | −0.2216 |
| 2 | −0.0003 | −0.2207 |
| 3 | 0.0000 | −0.2198 |
| 4 | 0.0004 | −0.2192 |
| 5 | 0.0007 | −0.2187 |
| 6 | 0.0011 | −0.2182 |
| 7 | 0.0017 | −0.2175 |
| 8 | 0.0027 | −0.2163 |
| 9 | 0.0046 | −0.2144 |
| 10 | 0.0073 | −0.2118 |
| 11 | 0.0108 | −0.2087 |
| 12 | 0.0160 | −0.2042 |
| 13 | 0.0230 | −0.1986 |
| 14 | 0.0318 | −0.1917 |
| 15 | 0.0432 | −0.1831 |
| 16 | 0.0573 | −0.1728 |
| 17 | 0.0751 | −0.1603 |
| 18 | 0.0967 | −0.1459 |
| 19 | 0.1224 | −0.1298 |
| 20 | 0.1517 | −0.1124 |
| 21 | 0.1833 | −0.0949 |
| 22 | 0.2170 | −0.0776 |
| 23 | 0.2512 | −0.0615 |
| 24 | 0.2860 | −0.0464 |
| 25 | 0.3212 | −0.0324 |
| 26 | 0.3568 | −0.0193 |
| 27 | 0.3927 | −0.0070 |
| 28 | 0.4288 | 0.0045 |
| 29 | 0.4846 | −0.0476 |
| 30 | 0.4488 | −0.0575 |
| 31 | 0.4131 | −0.0676 |
| 32 | 0.3775 | −0.0779 |
| 33 | 0.3418 | −0.0882 |
| 34 | 0.3063 | −0.0990 |
| 35 | 0.2711 | −0.1102 |
| 36 | 0.2360 | −0.1222 |
| 37 | 0.2012 | −0.1347 |
| 38 | 0.1681 | −0.1472 |
| 39 | 0.1371 | −0.1596 |
| 40 | 0.1097 | −0.1709 |
| 41 | 0.0863 | −0.1811 |
| 42 | 0.0670 | −0.1900 |
| 43 | 0.0516 | −0.1975 |
| 44 | 0.0391 | −0.2039 |
| 45 | 0.0295 | −0.2089 |
| 46 | 0.0217 | −0.2131 |
| 47 | 0.0157 | −0.2162 |
| 48 | 0.0116 | −0.2183 |
| 49 | 0.0083 | −0.2199 |
| 50 | 0.0059 | −0.2209 |
| 51 | 0.0045 | −0.2215 |
| 52 | 0.0036 | −0.2218 |
| 53 | 0.0030 | −0.2220 |
| 54 | 0.0024 | −0.2221 |
| 55 | 0.0018 | −0.2222 |
| 56 | 0.0008 | −0.2222 |
| Section 7 | | |
| 1 | 0.0000 | −0.2623 |
| 2 | −0.0003 | −0.2614 |
| 3 | 0.0000 | −0.2605 |
| 4 | 0.0003 | −0.2599 |
| 5 | 0.0006 | −0.2594 |
| 6 | 0.0010 | −0.2588 |
| 7 | 0.0016 | −0.2581 |
| 8 | 0.0026 | −0.2569 |
| 9 | 0.0044 | −0.2549 |
| 10 | 0.0071 | −0.2522 |
| 11 | 0.0106 | −0.2490 |
| 12 | 0.0159 | −0.2444 |
| 13 | 0.0229 | −0.2385 |
| 14 | 0.0316 | −0.2314 |
| 15 | 0.0431 | −0.2225 |
| 16 | 0.0572 | −0.2119 |
| 17 | 0.0750 | −0.1988 |
| 18 | 0.0966 | −0.1836 |
| 19 | 0.1221 | −0.1665 |
| 20 | 0.1513 | −0.1479 |
| 21 | 0.1827 | −0.1289 |
| 22 | 0.2161 | −0.1099 |
| 23 | 0.2501 | −0.0918 |
| 24 | 0.2845 | −0.0747 |
| 25 | 0.3194 | −0.0584 |
| 26 | 0.3547 | −0.0429 |
| 27 | 0.3902 | −0.0281 |
| 28 | 0.4261 | −0.0141 |
| 29 | 0.4809 | −0.0512 |
| 30 | 0.4451 | −0.0637 |
| 31 | 0.4095 | −0.0765 |
| 32 | 0.3739 | −0.0895 |
| 33 | 0.3385 | −0.1027 |
| 34 | 0.3032 | −0.1163 |
| 35 | 0.2681 | −0.1304 |
| 36 | 0.2333 | −0.1451 |
| 37 | 0.1987 | −0.1603 |
| 38 | 0.1659 | −0.1754 |
| 39 | 0.1353 | −0.1901 |
| 40 | 0.1082 | −0.2036 |
| 41 | 0.0851 | −0.2154 |
| 42 | 0.0660 | −0.2258 |
| 43 | 0.0509 | −0.2345 |
| 44 | 0.0386 | −0.2418 |
| 45 | 0.0292 | −0.2476 |
| 46 | 0.0215 | −0.2524 |
| 47 | 0.0157 | −0.2559 |
| 48 | 0.0115 | −0.2583 |
| 49 | 0.0083 | −0.2601 |
| 50 | 0.0059 | −0.2613 |
| 51 | 0.0045 | −0.2619 |
| 52 | 0.0036 | −0.2623 |
| 53 | 0.0030 | −0.2625 |
| 54 | 0.0024 | −0.2627 |
| 55 | 0.0018 | −0.2628 |
| 56 | 0.0008 | −0.2628 |
| Section 8 | | |
| 1 | 0.0000 | −0.2968 |
| 2 | −0.0003 | −0.2959 |
| 3 | 0.0000 | −0.2950 |
| 4 | 0.0003 | −0.2945 |
| 5 | 0.0007 | −0.2939 |
| 6 | 0.0010 | −0.2934 |
| 7 | 0.0016 | −0.2926 |
| 8 | 0.0027 | −0.2914 |
| 9 | 0.0045 | −0.2893 |
| 10 | 0.0071 | −0.2866 |
| 11 | 0.0107 | −0.2832 |
| 12 | 0.0159 | −0.2784 |
| 13 | 0.0229 | −0.2723 |
| 14 | 0.0317 | −0.2650 |
| 15 | 0.0431 | −0.2557 |
| 16 | 0.0572 | −0.2445 |
| 17 | 0.0750 | −0.2309 |
| 18 | 0.0966 | −0.2149 |
| 19 | 0.1220 | −0.1967 |
| 20 | 0.1510 | −0.1768 |
| 21 | 0.1822 | −0.1564 |
| 22 | 0.2154 | −0.1357 |
| 23 | 0.2490 | −0.1158 |
| 24 | 0.2831 | −0.0967 |
| 25 | 0.3177 | −0.0783 |
| 26 | 0.3527 | −0.0607 |
| 27 | 0.3880 | −0.0437 |
| 28 | 0.4237 | −0.0275 |
| 29 | 0.4776 | −0.0543 |
| 30 | 0.4418 | −0.0690 |
| 31 | 0.4062 | −0.0841 |
| 32 | 0.3708 | −0.0995 |
| 33 | 0.3355 | −0.1151 |
| 34 | 0.3004 | −0.1312 |

TABLE 1-continued

| | | |
|---|---|---|
| 35 | 0.2656 | −0.1477 |
| 36 | 0.2310 | −0.1648 |
| 37 | 0.1968 | −0.1823 |
| 38 | 0.1642 | −0.1996 |
| 39 | 0.1339 | −0.2163 |
| 40 | 0.1070 | −0.2314 |
| 41 | 0.0842 | −0.2448 |
| 42 | 0.0653 | −0.2564 |
| 43 | 0.0503 | −0.2660 |
| 44 | 0.0383 | −0.2741 |
| 45 | 0.0289 | −0.2804 |
| 46 | 0.0213 | −0.2856 |
| 47 | 0.0155 | −0.2895 |
| 48 | 0.0115 | −0.2921 |
| 49 | 0.0082 | −0.2940 |
| 50 | 0.0059 | −0.2954 |
| 51 | 0.0044 | −0.2961 |
| 52 | 0.0036 | −0.2965 |
| 53 | 0.0030 | −0.2968 |
| 54 | 0.0024 | −0.2970 |
| 55 | 0.0017 | −0.2972 |
| 56 | 0.0008 | −0.2973 |
| Section 9 | | |
| 1 | 0.0000 | −0.3242 |
| 2 | −0.0003 | −0.3233 |
| 3 | 0.0000 | −0.3224 |
| 4 | 0.0003 | −0.3218 |
| 5 | 0.0006 | −0.3212 |
| 6 | 0.0010 | −0.3207 |
| 7 | 0.0016 | −0.3199 |
| 8 | 0.0026 | −0.3186 |
| 9 | 0.0044 | −0.3165 |
| 10 | 0.0071 | −0.3136 |
| 11 | 0.0106 | −0.3101 |
| 12 | 0.0158 | −0.3051 |
| 13 | 0.0228 | −0.2988 |
| 14 | 0.0315 | −0.2912 |
| 15 | 0.0430 | −0.2815 |
| 16 | 0.0571 | −0.2698 |
| 17 | 0.0749 | −0.2555 |
| 18 | 0.0963 | −0.2386 |
| 19 | 0.1216 | −0.2194 |
| 20 | 0.1504 | −0.1983 |
| 21 | 0.1815 | −0.1764 |
| 22 | 0.2144 | −0.1541 |
| 23 | 0.2478 | −0.1325 |
| 24 | 0.2817 | −0.1116 |
| 25 | 0.3159 | −0.0913 |
| 26 | 0.3506 | −0.0717 |
| 27 | 0.3857 | −0.0529 |
| 28 | 0.4212 | −0.0347 |
| 29 | 0.4749 | −0.0555 |
| 30 | 0.4393 | −0.0722 |
| 31 | 0.4037 | −0.0893 |
| 32 | 0.3685 | −0.1066 |
| 33 | 0.3333 | −0.1244 |
| 34 | 0.2984 | −0.1425 |
| 35 | 0.2638 | −0.1610 |
| 36 | 0.2295 | −0.1800 |
| 37 | 0.1955 | −0.1995 |
| 38 | 0.1632 | −0.2186 |
| 39 | 0.1330 | −0.2369 |
| 40 | 0.1064 | −0.2535 |
| 41 | 0.0837 | −0.2680 |
| 42 | 0.0650 | −0.2806 |
| 43 | 0.0501 | −0.2910 |
| 44 | 0.0381 | −0.2997 |
| 45 | 0.0289 | −0.3065 |
| 46 | 0.0214 | −0.3120 |
| 47 | 0.0156 | −0.3162 |
| 48 | 0.0115 | −0.3190 |
| 49 | 0.0083 | −0.3211 |
| 50 | 0.0059 | −0.3225 |
| 51 | 0.0045 | −0.3233 |
| 52 | 0.0036 | −0.3237 |
| 53 | 0.0030 | −0.3240 |
| 54 | 0.0024 | −0.3242 |
| 55 | 0.0018 | −0.3245 |
| 56 | 0.0008 | −0.3246 |

TABLE 1-continued

| | | |
|---|---|---|
| Section 10 | | |
| 1 | 0.0000 | −0.3451 |
| 2 | −0.0003 | −0.3442 |
| 3 | 0.0000 | −0.3433 |
| 4 | 0.0003 | −0.3427 |
| 5 | 0.0006 | −0.3421 |
| 6 | 0.0010 | −0.3416 |
| 7 | 0.0016 | −0.3407 |
| 8 | 0.0026 | −0.3394 |
| 9 | 0.0044 | −0.3372 |
| 10 | 0.0070 | −0.3343 |
| 11 | 0.0105 | −0.3306 |
| 12 | 0.0157 | −0.3255 |
| 13 | 0.0227 | −0.3189 |
| 14 | 0.0314 | −0.3109 |
| 15 | 0.0428 | −0.3008 |
| 16 | 0.0569 | −0.2886 |
| 17 | 0.0746 | −0.2735 |
| 18 | 0.0960 | −0.2558 |
| 19 | 0.1211 | −0.2356 |
| 20 | 0.1498 | −0.2132 |
| 21 | 0.1806 | −0.1900 |
| 22 | 0.2133 | −0.1662 |
| 23 | 0.2464 | −0.1430 |
| 24 | 0.2800 | −0.1204 |
| 25 | 0.3140 | −0.0983 |
| 26 | 0.3484 | −0.0769 |
| 27 | 0.3832 | −0.0562 |
| 28 | 0.4186 | −0.0362 |
| 29 | 0.4732 | −0.0544 |
| 30 | 0.4375 | −0.0728 |
| 31 | 0.4021 | −0.0916 |
| 32 | 0.3670 | −0.1107 |
| 33 | 0.3320 | −0.1302 |
| 34 | 0.2973 | −0.1501 |
| 35 | 0.2629 | −0.1704 |
| 36 | 0.2288 | −0.1911 |
| 37 | 0.1949 | −0.2121 |
| 38 | 0.1627 | −0.2327 |
| 39 | 0.1327 | −0.2524 |
| 40 | 0.1062 | −0.2701 |
| 41 | 0.0835 | −0.2856 |
| 42 | 0.0649 | −0.2990 |
| 43 | 0.0501 | −0.3100 |
| 44 | 0.0382 | −0.3192 |
| 45 | 0.0289 | −0.3264 |
| 46 | 0.0214 | −0.3322 |
| 47 | 0.0156 | −0.3366 |
| 48 | 0.0116 | −0.3395 |
| 49 | 0.0084 | −0.3418 |
| 50 | 0.0060 | −0.3433 |
| 51 | 0.0046 | −0.3441 |
| 52 | 0.0037 | −0.3446 |
| 53 | 0.0031 | −0.3449 |
| 54 | 0.0025 | −0.3451 |
| 55 | 0.0018 | −0.3454 |
| 56 | 0.0009 | −0.3456 |
| Section 11 | | |
| 1 | 0.0000 | −0.3609 |
| 2 | −0.0003 | −0.3600 |
| 3 | 0.0000 | −0.3590 |
| 4 | 0.0003 | −0.3584 |
| 5 | 0.0006 | −0.3578 |
| 6 | 0.0010 | −0.3572 |
| 7 | 0.0015 | −0.3563 |
| 8 | 0.0026 | −0.3550 |
| 9 | 0.0043 | −0.3527 |
| 10 | 0.0070 | −0.3497 |
| 11 | 0.0104 | −0.3459 |
| 12 | 0.0156 | −0.3405 |
| 13 | 0.0226 | −0.3337 |
| 14 | 0.0313 | −0.3253 |
| 15 | 0.0426 | −0.3148 |
| 16 | 0.0567 | −0.3020 |
| 17 | 0.0743 | −0.2863 |
| 18 | 0.0956 | −0.2678 |
| 19 | 0.1207 | −0.2465 |
| 20 | 0.1491 | −0.2230 |

TABLE 1-continued

| | | |
|---|---|---|
| 21 | 0.1798 | −0.1984 |
| 22 | 0.2123 | −0.1732 |
| 23 | 0.2452 | −0.1485 |
| 24 | 0.2785 | −0.1243 |
| 25 | 0.3121 | −0.1006 |
| 26 | 0.3462 | −0.0774 |
| 27 | 0.3808 | −0.0549 |
| 28 | 0.4159 | −0.0332 |
| 29 | 0.4720 | −0.0504 |
| 30 | 0.4365 | −0.0704 |
| 31 | 0.4012 | −0.0907 |
| 32 | 0.3662 | −0.1115 |
| 33 | 0.3314 | −0.1326 |
| 34 | 0.2969 | −0.1541 |
| 35 | 0.2626 | −0.1759 |
| 36 | 0.2285 | −0.1981 |
| 37 | 0.1948 | −0.2205 |
| 38 | 0.1627 | −0.2424 |
| 39 | 0.1327 | −0.2633 |
| 40 | 0.1062 | −0.2820 |
| 41 | 0.0836 | −0.2984 |
| 42 | 0.0650 | −0.3124 |
| 43 | 0.0502 | −0.3240 |
| 44 | 0.0383 | −0.3336 |
| 45 | 0.0290 | −0.3412 |
| 46 | 0.0215 | −0.3472 |
| 47 | 0.0158 | −0.3518 |
| 48 | 0.0117 | −0.3549 |
| 49 | 0.0085 | −0.3572 |
| 50 | 0.0061 | −0.3588 |
| 51 | 0.0046 | −0.3597 |
| 52 | 0.0038 | −0.3602 |
| 53 | 0.0032 | −0.3605 |
| 54 | 0.0025 | −0.3608 |
| 55 | 0.0019 | −0.3611 |
| 56 | 0.0009 | −0.3613 |
| Section 12 | | |
| 1 | 0.0000 | −0.3729 |
| 2 | −0.0004 | −0.3719 |
| 3 | −0.0001 | −0.3709 |
| 4 | 0.0002 | −0.3703 |
| 5 | 0.0006 | −0.3696 |
| 6 | 0.0009 | −0.3690 |
| 7 | 0.0015 | −0.3682 |
| 8 | 0.0025 | −0.3667 |
| 9 | 0.0043 | −0.3644 |
| 10 | 0.0069 | −0.3613 |
| 11 | 0.0104 | −0.3573 |
| 12 | 0.0155 | −0.3518 |
| 13 | 0.0224 | −0.3446 |
| 14 | 0.0311 | −0.3360 |
| 15 | 0.0424 | −0.3250 |
| 16 | 0.0564 | −0.3116 |
| 17 | 0.0740 | −0.2952 |
| 18 | 0.0952 | −0.2759 |
| 19 | 0.1202 | −0.2536 |
| 20 | 0.1486 | −0.2289 |
| 21 | 0.1791 | −0.2031 |
| 22 | 0.2113 | −0.1765 |
| 23 | 0.2440 | −0.1503 |
| 24 | 0.2771 | −0.1246 |
| 25 | 0.3106 | −0.0994 |
| 26 | 0.3444 | −0.0746 |
| 27 | 0.3787 | −0.0504 |
| 28 | 0.4135 | −0.0270 |
| 29 | 0.4715 | −0.0437 |
| 30 | 0.4360 | −0.0652 |
| 31 | 0.4009 | −0.0871 |
| 32 | 0.3659 | −0.1094 |
| 33 | 0.3313 | −0.1320 |
| 34 | 0.2968 | −0.1549 |
| 35 | 0.2626 | −0.1782 |
| 36 | 0.2287 | −0.2017 |
| 37 | 0.1950 | −0.2255 |
| 38 | 0.1629 | −0.2486 |
| 39 | 0.1330 | −0.2706 |
| 40 | 0.1065 | −0.2903 |
| 41 | 0.0838 | −0.3075 |
| 42 | 0.0652 | −0.3222 |
| 43 | 0.0504 | −0.3343 |
| 44 | 0.0385 | −0.3443 |
| 45 | 0.0292 | −0.3522 |
| 46 | 0.0217 | −0.3585 |
| 47 | 0.0159 | −0.3633 |
| 48 | 0.0118 | −0.3665 |
| 49 | 0.0086 | −0.3689 |
| 50 | 0.0062 | −0.3706 |
| 51 | 0.0047 | −0.3715 |
| 52 | 0.0039 | −0.3721 |
| 53 | 0.0032 | −0.3724 |
| 54 | 0.0026 | −0.3727 |
| 55 | 0.0020 | −0.3730 |
| 56 | 0.0010 | −0.3733 |
| Section 13 | | |
| 1 | 0.0000 | −0.3823 |
| 2 | −0.0004 | −0.3813 |
| 3 | −0.0001 | −0.3803 |
| 4 | 0.0002 | −0.3796 |
| 5 | 0.0006 | −0.3790 |
| 6 | 0.0009 | −0.3784 |
| 7 | 0.0015 | −0.3775 |
| 8 | 0.0025 | −0.3760 |
| 9 | 0.0043 | −0.3736 |
| 10 | 0.0068 | −0.3704 |
| 11 | 0.0103 | −0.3663 |
| 12 | 0.0154 | −0.3605 |
| 13 | 0.0223 | −0.3530 |
| 14 | 0.0310 | −0.3440 |
| 15 | 0.0422 | −0.3325 |
| 16 | 0.0562 | −0.3187 |
| 17 | 0.0737 | −0.3016 |
| 18 | 0.0949 | −0.2814 |
| 19 | 0.1198 | −0.2581 |
| 20 | 0.1481 | −0.2323 |
| 21 | 0.1784 | −0.2051 |
| 22 | 0.2106 | −0.1772 |
| 23 | 0.2431 | −0.1496 |
| 24 | 0.2760 | −0.1225 |
| 25 | 0.3092 | −0.0957 |
| 26 | 0.3428 | −0.0694 |
| 27 | 0.3768 | −0.0435 |
| 28 | 0.4113 | −0.0183 |
| 29 | 0.4713 | −0.0346 |
| 30 | 0.4359 | −0.0577 |
| 31 | 0.4009 | −0.0812 |
| 32 | 0.3661 | −0.1050 |
| 33 | 0.3315 | −0.1290 |
| 34 | 0.2971 | −0.1534 |
| 35 | 0.2630 | −0.1780 |
| 36 | 0.2290 | −0.2028 |
| 37 | 0.1954 | −0.2280 |
| 38 | 0.1633 | −0.2523 |
| 39 | 0.1334 | −0.2754 |
| 40 | 0.1068 | −0.2961 |
| 41 | 0.0842 | −0.3141 |
| 42 | 0.0655 | −0.3294 |
| 43 | 0.0507 | −0.3420 |
| 44 | 0.0387 | −0.3525 |
| 45 | 0.0294 | −0.3606 |
| 46 | 0.0219 | −0.3672 |
| 47 | 0.0160 | −0.3722 |
| 48 | 0.0119 | −0.3755 |
| 49 | 0.0087 | −0.3781 |
| 50 | 0.0063 | −0.3798 |
| 51 | 0.0049 | −0.3808 |
| 52 | 0.0040 | −0.3814 |
| 53 | 0.0033 | −0.3817 |
| 54 | 0.0027 | −0.3821 |
| 55 | 0.0021 | −0.3824 |
| 56 | 0.0010 | −0.3827 |
| Section 14 | | |
| 1 | 0.0000 | −0.3907 |
| 2 | −0.0004 | −0.3896 |
| 3 | −0.0001 | −0.3885 |
| 4 | 0.0002 | −0.3879 |
| 5 | 0.0005 | −0.3872 |
| 6 | 0.0009 | −0.3866 |

TABLE 1-continued

| | | |
|---|---|---|
| 7 | 0.0014 | −0.3856 |
| 8 | 0.0024 | −0.3841 |
| 9 | 0.0042 | −0.3816 |
| 10 | 0.0067 | −0.3782 |
| 11 | 0.0101 | −0.3740 |
| 12 | 0.0152 | −0.3680 |
| 13 | 0.0221 | −0.3602 |
| 14 | 0.0307 | −0.3508 |
| 15 | 0.0420 | −0.3389 |
| 16 | 0.0559 | −0.3244 |
| 17 | 0.0734 | −0.3066 |
| 18 | 0.0946 | −0.2855 |
| 19 | 0.1194 | −0.2613 |
| 20 | 0.1477 | −0.2342 |
| 21 | 0.1780 | −0.2058 |
| 22 | 0.2100 | −0.1764 |
| 23 | 0.2424 | −0.1474 |
| 24 | 0.2751 | −0.1188 |
| 25 | 0.3082 | −0.0905 |
| 26 | 0.3416 | −0.0626 |
| 27 | 0.3753 | −0.0351 |
| 28 | 0.4095 | −0.0081 |
| 29 | 0.4713 | −0.0234 |
| 30 | 0.4360 | −0.0481 |
| 31 | 0.4011 | −0.0732 |
| 32 | 0.3664 | −0.0985 |
| 33 | 0.3319 | −0.1241 |
| 34 | 0.2976 | −0.1499 |
| 35 | 0.2635 | −0.1760 |
| 36 | 0.2295 | −0.2023 |
| 37 | 0.1958 | −0.2288 |
| 38 | 0.1638 | −0.2543 |
| 39 | 0.1338 | −0.2786 |
| 40 | 0.1072 | −0.3003 |
| 41 | 0.0845 | −0.3192 |
| 42 | 0.0657 | −0.3353 |
| 43 | 0.0509 | −0.3484 |
| 44 | 0.0389 | −0.3593 |
| 45 | 0.0296 | −0.3679 |
| 46 | 0.0220 | −0.3747 |
| 47 | 0.0162 | −0.3799 |
| 48 | 0.0121 | −0.3834 |
| 49 | 0.0088 | −0.3861 |
| 50 | 0.0064 | −0.3879 |
| 51 | 0.0049 | −0.3890 |
| 52 | 0.0041 | −0.3896 |
| 53 | 0.0034 | −0.3900 |
| 54 | 0.0028 | −0.3903 |
| 55 | 0.0022 | −0.3906 |
| 56 | 0.0011 | −0.3910 |
| Section 15 | | |
| 1 | 0.0000 | −0.3992 |
| 2 | −0.0004 | −0.3981 |
| 3 | −0.0001 | −0.3969 |
| 4 | 0.0001 | −0.3962 |
| 5 | 0.0004 | −0.3955 |
| 6 | 0.0007 | −0.3949 |
| 7 | 0.0013 | −0.3939 |
| 8 | 0.0022 | −0.3923 |
| 9 | 0.0039 | −0.3897 |
| 10 | 0.0064 | −0.3861 |
| 11 | 0.0098 | −0.3817 |
| 12 | 0.0148 | −0.3754 |
| 13 | 0.0217 | −0.3673 |
| 14 | 0.0303 | −0.3575 |
| 15 | 0.0416 | −0.3451 |
| 16 | 0.0556 | −0.3301 |
| 17 | 0.0731 | −0.3115 |
| 18 | 0.0943 | −0.2895 |
| 19 | 0.1192 | −0.2641 |
| 20 | 0.1474 | −0.2358 |
| 21 | 0.1777 | −0.2060 |
| 22 | 0.2096 | −0.1751 |
| 23 | 0.2420 | −0.1446 |
| 24 | 0.2746 | −0.1144 |
| 25 | 0.3076 | −0.0846 |
| 26 | 0.3409 | −0.0550 |
| 27 | 0.3745 | −0.0259 |
| 28 | 0.4084 | 0.0030 |
| 29 | 0.4710 | −0.0094 |
| 30 | 0.4359 | −0.0360 |
| 31 | 0.4011 | −0.0629 |
| 32 | 0.3665 | −0.0900 |
| 33 | 0.3320 | −0.1173 |
| 34 | 0.2978 | −0.1447 |
| 35 | 0.2637 | −0.1724 |
| 36 | 0.2298 | −0.2002 |
| 37 | 0.1961 | −0.2283 |
| 38 | 0.1640 | −0.2554 |
| 39 | 0.1340 | −0.2810 |
| 40 | 0.1074 | −0.3039 |
| 41 | 0.0846 | −0.3238 |
| 42 | 0.0659 | −0.3407 |
| 43 | 0.0511 | −0.3546 |
| 44 | 0.0390 | −0.3661 |
| 45 | 0.0297 | −0.3750 |
| 46 | 0.0222 | −0.3822 |
| 47 | 0.0163 | −0.3876 |
| 48 | 0.0122 | −0.3913 |
| 49 | 0.0089 | −0.3942 |
| 50 | 0.0066 | −0.3961 |
| 51 | 0.0051 | −0.3972 |
| 52 | 0.0042 | −0.3979 |
| 53 | 0.0036 | −0.3983 |
| 54 | 0.0029 | −0.3987 |
| 55 | 0.0023 | −0.3990 |
| 56 | 0.0012 | −0.3995 |
| Section 16 | | |
| 1 | 0.0000 | −0.4076 |
| 2 | −0.0005 | −0.4064 |
| 3 | −0.0002 | −0.4052 |
| 4 | 0.0000 | −0.4045 |
| 5 | 0.0003 | −0.4037 |
| 6 | 0.0006 | −0.4030 |
| 7 | 0.0011 | −0.4020 |
| 8 | 0.0020 | −0.4003 |
| 9 | 0.0036 | −0.3976 |
| 10 | 0.0060 | −0.3939 |
| 11 | 0.0094 | −0.3892 |
| 12 | 0.0144 | −0.3826 |
| 13 | 0.0212 | −0.3742 |
| 14 | 0.0299 | −0.3640 |
| 15 | 0.0413 | −0.3511 |
| 16 | 0.0554 | −0.3355 |
| 17 | 0.0730 | −0.3161 |
| 18 | 0.0943 | −0.2931 |
| 19 | 0.1192 | −0.2666 |
| 20 | 0.1475 | −0.2369 |
| 21 | 0.1778 | −0.2057 |
| 22 | 0.2098 | −0.1733 |
| 23 | 0.2421 | −0.1412 |
| 24 | 0.2748 | −0.1094 |
| 25 | 0.3077 | −0.0779 |
| 26 | 0.3409 | −0.0467 |
| 27 | 0.3744 | −0.0159 |
| 28 | 0.4082 | 0.0147 |
| 29 | 0.4707 | 0.0066 |
| 30 | 0.4358 | −0.0219 |
| 31 | 0.4011 | −0.0507 |
| 32 | 0.3665 | −0.0796 |
| 33 | 0.3322 | −0.1087 |
| 34 | 0.2980 | −0.1380 |
| 35 | 0.2639 | −0.1674 |
| 36 | 0.2300 | −0.1970 |
| 37 | 0.1964 | −0.2268 |
| 38 | 0.1643 | −0.2555 |
| 39 | 0.1342 | −0.2827 |
| 40 | 0.1075 | −0.3069 |
| 41 | 0.0848 | −0.3279 |
| 42 | 0.0660 | −0.3458 |
| 43 | 0.0512 | −0.3604 |
| 44 | 0.0392 | −0.3725 |
| 45 | 0.0299 | −0.3819 |
| 46 | 0.0223 | −0.3895 |
| 47 | 0.0165 | −0.3953 |
| 48 | 0.0124 | −0.3992 |
| 49 | 0.0091 | −0.4021 |
| 50 | 0.0067 | −0.4042 |

TABLE 1-continued

| | | |
|---|---|---|
| 51 | 0.0052 | −0.4054 |
| 52 | 0.0043 | −0.4061 |
| 53 | 0.0037 | −0.4065 |
| 54 | 0.0031 | −0.4069 |
| 55 | 0.0024 | −0.4073 |
| 56 | 0.0013 | −0.4079 |
| Section 17 | | |
| 1 | 0.0000 | −0.4165 |
| 2 | −0.0005 | −0.4153 |
| 3 | −0.0003 | −0.4140 |
| 4 | −0.0001 | −0.4133 |
| 5 | 0.0002 | −0.4125 |
| 6 | 0.0005 | −0.4118 |
| 7 | 0.0010 | −0.4107 |
| 8 | 0.0018 | −0.4090 |
| 9 | 0.0034 | −0.4061 |
| 10 | 0.0059 | −0.4022 |
| 11 | 0.0092 | −0.3974 |
| 12 | 0.0142 | −0.3905 |
| 13 | 0.0210 | −0.3817 |
| 14 | 0.0297 | −0.3711 |
| 15 | 0.0412 | −0.3576 |
| 16 | 0.0554 | −0.3412 |
| 17 | 0.0731 | −0.3210 |
| 18 | 0.0945 | −0.2969 |
| 19 | 0.1196 | −0.2691 |
| 20 | 0.1479 | −0.2381 |
| 21 | 0.1784 | −0.2053 |
| 22 | 0.2105 | −0.1712 |
| 23 | 0.2428 | −0.1375 |
| 24 | 0.2755 | −0.1040 |
| 25 | 0.3085 | −0.0708 |
| 26 | 0.3417 | −0.0379 |
| 27 | 0.3752 | −0.0052 |
| 28 | 0.4090 | 0.0273 |
| 29 | 0.4705 | 0.0245 |
| 30 | 0.4358 | −0.0062 |
| 31 | 0.4011 | −0.0370 |
| 32 | 0.3667 | −0.0679 |
| 33 | 0.3323 | −0.0990 |
| 34 | 0.2982 | −0.1302 |
| 35 | 0.2641 | −0.1616 |
| 36 | 0.2303 | −0.1931 |
| 37 | 0.1966 | −0.2248 |
| 38 | 0.1645 | −0.2553 |
| 39 | 0.1344 | −0.2841 |
| 40 | 0.1077 | −0.3098 |
| 41 | 0.0849 | −0.3321 |
| 42 | 0.0662 | −0.3510 |
| 43 | 0.0513 | −0.3665 |
| 44 | 0.0393 | −0.3793 |
| 45 | 0.0300 | −0.3893 |
| 46 | 0.0225 | −0.3973 |
| 47 | 0.0166 | −0.4034 |
| 48 | 0.0125 | −0.4075 |
| 49 | 0.0092 | −0.4106 |
| 50 | 0.0068 | −0.4128 |
| 51 | 0.0053 | −0.4141 |
| 52 | 0.0044 | −0.4148 |
| 53 | 0.0038 | −0.4153 |
| 54 | 0.0032 | −0.4157 |
| 55 | 0.0025 | −0.4162 |
| 56 | 0.0013 | −0.4168 |
| Section 18 | | |
| 1 | 0.0000 | −0.4259 |
| 2 | −0.0006 | −0.4247 |
| 3 | −0.0004 | −0.4233 |
| 4 | −0.0001 | −0.4225 |
| 5 | 0.0001 | −0.4218 |
| 6 | 0.0004 | −0.4210 |
| 7 | 0.0009 | −0.4199 |
| 8 | 0.0017 | −0.4181 |
| 9 | 0.0033 | −0.4151 |
| 10 | 0.0057 | −0.4110 |
| 11 | 0.0090 | −0.4059 |
| 12 | 0.0140 | −0.3987 |
| 13 | 0.0209 | −0.3895 |
| 14 | 0.0297 | −0.3784 |

TABLE 1-continued

| | | |
|---|---|---|
| 15 | 0.0412 | −0.3642 |
| 16 | 0.0555 | −0.3471 |
| 17 | 0.0733 | −0.3259 |
| 18 | 0.0949 | −0.3007 |
| 19 | 0.1201 | −0.2715 |
| 20 | 0.1487 | −0.2389 |
| 21 | 0.1792 | −0.2044 |
| 22 | 0.2115 | −0.1686 |
| 23 | 0.2440 | −0.1331 |
| 24 | 0.2768 | −0.0978 |
| 25 | 0.3098 | −0.0627 |
| 26 | 0.3431 | −0.0279 |
| 27 | 0.3766 | 0.0067 |
| 28 | 0.4104 | 0.0411 |
| 29 | 0.4706 | 0.0440 |
| 30 | 0.4360 | 0.0112 |
| 31 | 0.4015 | −0.0218 |
| 32 | 0.3671 | −0.0549 |
| 33 | 0.3328 | −0.0881 |
| 34 | 0.2986 | −0.1215 |
| 35 | 0.2646 | −0.1550 |
| 36 | 0.2307 | −0.1886 |
| 37 | 0.1970 | −0.2223 |
| 38 | 0.1648 | −0.2547 |
| 39 | 0.1347 | −0.2854 |
| 40 | 0.1079 | −0.3127 |
| 41 | 0.0851 | −0.3363 |
| 42 | 0.0664 | −0.3564 |
| 43 | 0.0516 | −0.3729 |
| 44 | 0.0396 | −0.3864 |
| 45 | 0.0303 | −0.3969 |
| 46 | 0.0227 | −0.4055 |
| 47 | 0.0168 | −0.4119 |
| 48 | 0.0127 | −0.4163 |
| 49 | 0.0094 | −0.4196 |
| 50 | 0.0070 | −0.4219 |
| 51 | 0.0055 | −0.4233 |
| 52 | 0.0046 | −0.4241 |
| 53 | 0.0039 | −0.4245 |
| 54 | 0.0033 | −0.4250 |
| 55 | 0.0026 | −0.4255 |
| 56 | 0.0014 | −0.4261 |
| Section 19 | | |
| 1 | 0.0000 | −0.4369 |
| 2 | −0.0006 | −0.4356 |
| 3 | −0.0004 | −0.4342 |
| 4 | −0.0002 | −0.4334 |
| 5 | 0.0000 | −0.4325 |
| 6 | 0.0003 | −0.4318 |
| 7 | 0.0007 | −0.4306 |
| 8 | 0.0016 | −0.4287 |
| 9 | 0.0031 | −0.4256 |
| 10 | 0.0055 | −0.4213 |
| 11 | 0.0088 | −0.4160 |
| 12 | 0.0139 | −0.4084 |
| 13 | 0.0208 | −0.3988 |
| 14 | 0.0296 | −0.3871 |
| 15 | 0.0412 | −0.3722 |
| 16 | 0.0556 | −0.3542 |
| 17 | 0.0736 | −0.3319 |
| 18 | 0.0953 | −0.3053 |
| 19 | 0.1208 | −0.2746 |
| 20 | 0.1495 | −0.2402 |
| 21 | 0.1802 | −0.2038 |
| 22 | 0.2126 | −0.1660 |
| 23 | 0.2452 | −0.1284 |
| 24 | 0.2781 | −0.0910 |
| 25 | 0.3113 | −0.0539 |
| 26 | 0.3447 | −0.0169 |
| 27 | 0.3782 | 0.0198 |
| 28 | 0.4121 | 0.0563 |
| 29 | 0.4710 | 0.0651 |
| 30 | 0.4364 | 0.0298 |
| 31 | 0.4019 | −0.0055 |
| 32 | 0.3675 | −0.0410 |
| 33 | 0.3332 | −0.0766 |
| 34 | 0.2991 | −0.1123 |
| 35 | 0.2650 | −0.1480 |
| 36 | 0.2311 | −0.1839 |

TABLE 1-continued

| | | |
|---|---|---|
| 37 | 0.1974 | −0.2200 |
| 38 | 0.1652 | −0.2546 |
| 39 | 0.1351 | −0.2872 |
| 40 | 0.1082 | −0.3164 |
| 41 | 0.0853 | −0.3416 |
| 42 | 0.0666 | −0.3630 |
| 43 | 0.0518 | −0.3804 |
| 44 | 0.0398 | −0.3948 |
| 45 | 0.0305 | −0.4060 |
| 46 | 0.0229 | −0.4151 |
| 47 | 0.0170 | −0.4219 |
| 48 | 0.0129 | −0.4265 |
| 49 | 0.0096 | −0.4301 |
| 50 | 0.0071 | −0.4325 |
| 51 | 0.0056 | −0.4340 |
| 52 | 0.0047 | −0.4348 |
| 53 | 0.0040 | −0.4353 |
| 54 | 0.0034 | −0.4359 |
| 55 | 0.0027 | −0.4363 |
| 56 | 0.0014 | −0.4371 |
| Section 20 | | |
| 1 | 0.0000 | −0.4491 |
| 2 | −0.0007 | −0.4478 |
| 3 | −0.0005 | −0.4463 |
| 4 | −0.0003 | −0.4454 |
| 5 | −0.0001 | −0.4446 |
| 6 | 0.0002 | −0.4438 |
| 7 | 0.0006 | −0.4426 |
| 8 | 0.0014 | −0.4406 |
| 9 | 0.0030 | −0.4373 |
| 10 | 0.0054 | −0.4328 |
| 11 | 0.0087 | −0.4272 |
| 12 | 0.0137 | −0.4193 |
| 13 | 0.0207 | −0.4091 |
| 14 | 0.0296 | −0.3967 |
| 15 | 0.0413 | −0.3811 |
| 16 | 0.0558 | −0.3621 |
| 17 | 0.0740 | −0.3385 |
| 18 | 0.0958 | −0.3104 |
| 19 | 0.1213 | −0.2778 |
| 20 | 0.1501 | −0.2413 |
| 21 | 0.1809 | −0.2027 |
| 22 | 0.2134 | −0.1626 |
| 23 | 0.2461 | −0.1226 |
| 24 | 0.2791 | −0.0829 |
| 25 | 0.3124 | −0.0435 |
| 26 | 0.3459 | −0.0043 |
| 27 | 0.3797 | 0.0347 |
| 28 | 0.4137 | 0.0736 |
| 29 | 0.4715 | 0.0878 |
| 30 | 0.4369 | 0.0500 |
| 31 | 0.4024 | 0.0122 |
| 32 | 0.3679 | −0.0258 |
| 33 | 0.3335 | −0.0638 |
| 34 | 0.2993 | −0.1020 |
| 35 | 0.2653 | −0.1403 |
| 36 | 0.2314 | −0.1788 |
| 37 | 0.1977 | −0.2174 |
| 38 | 0.1655 | −0.2545 |
| 39 | 0.1354 | −0.2894 |
| 40 | 0.1085 | −0.3206 |
| 41 | 0.0856 | −0.3475 |
| 42 | 0.0669 | −0.3703 |
| 43 | 0.0521 | −0.3890 |
| 44 | 0.0401 | −0.4043 |
| 45 | 0.0308 | −0.4162 |
| 46 | 0.0232 | −0.4258 |
| 47 | 0.0173 | −0.4331 |
| 48 | 0.0131 | −0.4380 |
| 49 | 0.0098 | −0.4418 |
| 50 | 0.0073 | −0.4444 |
| 51 | 0.0058 | −0.4460 |
| 52 | 0.0048 | −0.4468 |
| 53 | 0.0042 | −0.4474 |
| 54 | 0.0035 | −0.4479 |
| 55 | 0.0028 | −0.4485 |
| 56 | 0.0015 | −0.4492 |
| Section 21 | | |

TABLE 1-continued

| | | |
|---|---|---|
| 1 | 0.0000 | −0.4619 |
| 2 | −0.0007 | −0.4605 |
| 3 | −0.0006 | −0.4590 |
| 4 | −0.0004 | −0.4581 |
| 5 | −0.0002 | −0.4572 |
| 6 | 0.0000 | −0.4563 |
| 7 | 0.0005 | −0.4551 |
| 8 | 0.0013 | −0.4530 |
| 9 | 0.0028 | −0.4496 |
| 10 | 0.0052 | −0.4449 |
| 11 | 0.0084 | −0.4390 |
| 12 | 0.0135 | −0.4306 |
| 13 | 0.0204 | −0.4199 |
| 14 | 0.0293 | −0.4068 |
| 15 | 0.0411 | −0.3903 |
| 16 | 0.0557 | −0.3703 |
| 17 | 0.0740 | −0.3454 |
| 18 | 0.0958 | −0.3157 |
| 19 | 0.1215 | −0.2813 |
| 20 | 0.1505 | −0.2428 |
| 21 | 0.1815 | −0.2020 |
| 22 | 0.2142 | −0.1596 |
| 23 | 0.2471 | −0.1175 |
| 24 | 0.2804 | −0.0755 |
| 25 | 0.3139 | −0.0338 |
| 26 | 0.3477 | 0.0076 |
| 27 | 0.3817 | 0.0488 |
| 28 | 0.4159 | 0.0900 |
| 29 | 0.4734 | 0.1085 |
| 30 | 0.4387 | 0.0683 |
| 31 | 0.4040 | 0.0281 |
| 32 | 0.3693 | −0.0122 |
| 33 | 0.3347 | −0.0526 |
| 34 | 0.3003 | −0.0931 |
| 35 | 0.2660 | −0.1338 |
| 36 | 0.2320 | −0.1746 |
| 37 | 0.1981 | −0.2156 |
| 38 | 0.1658 | −0.2550 |
| 39 | 0.1356 | −0.2921 |
| 40 | 0.1087 | −0.3253 |
| 41 | 0.0857 | −0.3539 |
| 42 | 0.0670 | −0.3781 |
| 43 | 0.0522 | −0.3979 |
| 44 | 0.0403 | −0.4142 |
| 45 | 0.0310 | −0.4268 |
| 46 | 0.0234 | −0.4370 |
| 47 | 0.0175 | −0.4447 |
| 48 | 0.0133 | −0.4500 |
| 49 | 0.0099 | −0.4540 |
| 50 | 0.0074 | −0.4568 |
| 51 | 0.0059 | −0.4584 |
| 52 | 0.0049 | −0.4594 |
| 53 | 0.0042 | −0.4600 |
| 54 | 0.0036 | −0.4606 |
| 55 | 0.0029 | −0.4611 |
| 56 | 0.0015 | −0.4620 |
| Section 22 | | |
| 1 | 0.0000 | −0.4798 |
| 2 | −0.0008 | −0.4784 |
| 3 | −0.0007 | −0.4768 |
| 4 | −0.0005 | −0.4759 |
| 5 | −0.0003 | −0.4750 |
| 6 | −0.0001 | −0.4741 |
| 7 | 0.0003 | −0.4727 |
| 8 | 0.0011 | −0.4706 |
| 9 | 0.0026 | −0.4670 |
| 10 | 0.0049 | −0.4620 |
| 11 | 0.0082 | −0.4558 |
| 12 | 0.0132 | −0.4470 |
| 13 | 0.0202 | −0.4356 |
| 14 | 0.0291 | −0.4219 |
| 15 | 0.0409 | −0.4044 |
| 16 | 0.0556 | −0.3831 |
| 17 | 0.0740 | −0.3568 |
| 18 | 0.0959 | −0.3254 |
| 19 | 0.1217 | −0.2889 |
| 20 | 0.1509 | −0.2481 |
| 21 | 0.1821 | −0.2048 |
| 22 | 0.2149 | −0.1599 |

TABLE 1-continued

| | | |
|---|---|---|
| 23 | 0.2481 | −0.1152 |
| 24 | 0.2815 | −0.0707 |
| 25 | 0.3152 | −0.0264 |
| 26 | 0.3492 | 0.0176 |
| 27 | 0.3833 | 0.0615 |
| 28 | 0.4176 | 0.1052 |
| 29 | 0.4763 | 0.1270 |
| 30 | 0.4414 | 0.0841 |
| 31 | 0.4064 | 0.0413 |
| 32 | 0.3715 | −0.0016 |
| 33 | 0.3367 | −0.0446 |
| 34 | 0.3021 | −0.0878 |
| 35 | 0.2676 | −0.1311 |
| 36 | 0.2333 | −0.1745 |
| 37 | 0.1992 | −0.2180 |
| 38 | 0.1667 | −0.2599 |
| 39 | 0.1362 | −0.2994 |
| 40 | 0.1092 | −0.3346 |
| 41 | 0.0861 | −0.3650 |
| 42 | 0.0673 | −0.3908 |
| 43 | 0.0525 | −0.4118 |
| 44 | 0.0405 | −0.4291 |
| 45 | 0.0312 | −0.4425 |
| 46 | 0.0236 | −0.4533 |
| 47 | 0.0177 | −0.4615 |
| 48 | 0.0134 | −0.4671 |
| 49 | 0.0100 | −0.4714 |
| 50 | 0.0075 | −0.4743 |
| 51 | 0.0060 | −0.4761 |
| 52 | 0.0050 | −0.4771 |
| 53 | 0.0043 | −0.4777 |
| 54 | 0.0036 | −0.4784 |
| 55 | 0.0029 | −0.4790 |
| 56 | 0.0016 | −0.4798 |
| Section 23 | | |
| 1 | 0.0000 | −0.5023 |
| 2 | −0.0009 | −0.5010 |
| 3 | −0.0008 | −0.4994 |
| 4 | −0.0006 | −0.4984 |
| 5 | −0.0005 | −0.4974 |
| 6 | −0.0002 | −0.4965 |
| 7 | 0.0002 | −0.4951 |
| 8 | 0.0010 | −0.4928 |
| 9 | 0.0024 | −0.4890 |
| 10 | 0.0048 | −0.4838 |
| 11 | 0.0080 | −0.4772 |
| 12 | 0.0131 | −0.4678 |
| 13 | 0.0200 | −0.4558 |
| 14 | 0.0290 | −0.4412 |
| 15 | 0.0409 | −0.4226 |
| 16 | 0.0557 | −0.4001 |
| 17 | 0.0742 | −0.3721 |
| 18 | 0.0963 | −0.3387 |
| 19 | 0.1223 | −0.3000 |
| 20 | 0.1516 | −0.2566 |
| 21 | 0.1830 | −0.2106 |
| 22 | 0.2161 | −0.1628 |
| 23 | 0.2494 | −0.1152 |
| 24 | 0.2830 | −0.0678 |
| 25 | 0.3168 | −0.0205 |
| 26 | 0.3508 | 0.0265 |
| 27 | 0.3850 | 0.0734 |
| 28 | 0.4194 | 0.1201 |
| 29 | 0.4795 | 0.1452 |
| 30 | 0.4444 | 0.0994 |
| 31 | 0.4093 | 0.0536 |
| 32 | 0.3742 | 0.0077 |
| 33 | 0.3392 | −0.0383 |
| 34 | 0.3043 | −0.0844 |
| 35 | 0.2696 | −0.1306 |
| 36 | 0.2351 | −0.1769 |
| 37 | 0.2007 | −0.2234 |
| 38 | 0.1679 | −0.2680 |
| 39 | 0.1372 | −0.3101 |
| 40 | 0.1099 | −0.3477 |
| 41 | 0.0867 | −0.3801 |
| 42 | 0.0677 | −0.4075 |
| 43 | 0.0529 | −0.4299 |
| 44 | 0.0409 | −0.4483 |

TABLE 1-continued

| | | |
|---|---|---|
| 45 | 0.0315 | −0.4626 |
| 46 | 0.0239 | −0.4741 |
| 47 | 0.0179 | −0.4828 |
| 48 | 0.0136 | −0.4888 |
| 49 | 0.0102 | −0.4933 |
| 50 | 0.0077 | −0.4965 |
| 51 | 0.0061 | −0.4983 |
| 52 | 0.0051 | −0.4994 |
| 53 | 0.0044 | −0.5001 |
| 54 | 0.0037 | −0.5008 |
| 55 | 0.0030 | −0.5014 |
| 56 | 0.0016 | −0.5024 |
| Section 24 | | |
| 1 | 0.0000 | −0.5283 |
| 2 | −0.0009 | −0.5270 |
| 3 | −0.0009 | −0.5253 |
| 4 | −0.0007 | −0.5243 |
| 5 | −0.0005 | −0.5233 |
| 6 | −0.0003 | −0.5223 |
| 7 | 0.0002 | −0.5208 |
| 8 | 0.0010 | −0.5184 |
| 9 | 0.0025 | −0.5144 |
| 10 | 0.0048 | −0.5089 |
| 11 | 0.0081 | −0.5019 |
| 12 | 0.0132 | −0.4920 |
| 13 | 0.0203 | −0.4793 |
| 14 | 0.0293 | −0.4637 |
| 15 | 0.0413 | −0.4439 |
| 16 | 0.0562 | −0.4199 |
| 17 | 0.0748 | −0.3900 |
| 18 | 0.0971 | −0.3544 |
| 19 | 0.1233 | −0.3131 |
| 20 | 0.1528 | −0.2667 |
| 21 | 0.1845 | −0.2176 |
| 22 | 0.2178 | −0.1665 |
| 23 | 0.2512 | −0.1156 |
| 24 | 0.2849 | −0.0648 |
| 25 | 0.3188 | −0.0142 |
| 26 | 0.3528 | 0.0364 |
| 27 | 0.3869 | 0.0867 |
| 28 | 0.4212 | 0.1370 |
| 29 | 0.4826 | 0.1661 |
| 30 | 0.4473 | 0.1169 |
| 31 | 0.4120 | 0.0676 |
| 32 | 0.3768 | 0.0183 |
| 33 | 0.3416 | −0.0312 |
| 34 | 0.3066 | −0.0807 |
| 35 | 0.2716 | −0.1303 |
| 36 | 0.2368 | −0.1800 |
| 37 | 0.2021 | −0.2298 |
| 38 | 0.1691 | −0.2776 |
| 39 | 0.1381 | −0.3226 |
| 40 | 0.1107 | −0.3629 |
| 41 | 0.0873 | −0.3976 |
| 42 | 0.0682 | −0.4270 |
| 43 | 0.0533 | −0.4509 |
| 44 | 0.0413 | −0.4706 |
| 45 | 0.0319 | −0.4858 |
| 46 | 0.0242 | −0.4981 |
| 47 | 0.0182 | −0.5075 |
| 48 | 0.0139 | −0.5138 |
| 49 | 0.0104 | −0.5187 |
| 50 | 0.0078 | −0.5221 |
| 51 | 0.0062 | −0.5241 |
| 52 | 0.0052 | −0.5252 |
| 53 | 0.0045 | −0.5260 |
| 54 | 0.0038 | −0.5267 |
| 55 | 0.0030 | −0.5274 |
| 56 | 0.0016 | −0.5283 |
| Section 25 | | |
| 1 | 0.0000 | −0.5566 |
| 2 | −0.0010 | −0.5553 |
| 3 | −0.0009 | −0.5536 |
| 4 | −0.0007 | −0.5525 |
| 5 | −0.0005 | −0.5515 |
| 6 | −0.0002 | −0.5504 |
| 7 | 0.0002 | −0.5489 |
| 8 | 0.0011 | −0.5463 |

TABLE 1-continued

| | | |
|---|---|---|
| 9 | 0.0027 | −0.5421 |
| 10 | 0.0052 | −0.5363 |
| 11 | 0.0086 | −0.5290 |
| 12 | 0.0137 | −0.5185 |
| 13 | 0.0209 | −0.5049 |
| 14 | 0.0300 | −0.4883 |
| 15 | 0.0421 | −0.4672 |
| 16 | 0.0571 | −0.4415 |
| 17 | 0.0758 | −0.4096 |
| 18 | 0.0984 | −0.3715 |
| 19 | 0.1248 | −0.3273 |
| 20 | 0.1547 | −0.2777 |
| 21 | 0.1866 | −0.2252 |
| 22 | 0.2202 | −0.1705 |
| 23 | 0.2539 | −0.1158 |
| 24 | 0.2877 | −0.0613 |
| 25 | 0.3217 | −0.0069 |
| 26 | 0.3557 | 0.0474 |
| 27 | 0.3898 | 0.1017 |
| 28 | 0.4238 | 0.1559 |
| 29 | 0.4864 | 0.1894 |
| 30 | 0.4507 | 0.1366 |
| 31 | 0.4151 | 0.0836 |
| 32 | 0.3796 | 0.0305 |
| 33 | 0.3441 | −0.0226 |
| 34 | 0.3087 | −0.0758 |
| 35 | 0.2734 | −0.1291 |
| 36 | 0.2383 | −0.1825 |
| 37 | 0.2033 | −0.2361 |
| 38 | 0.1699 | −0.2874 |
| 39 | 0.1388 | −0.3359 |
| 40 | 0.1112 | −0.3791 |
| 41 | 0.0877 | −0.4165 |
| 42 | 0.0687 | −0.4481 |
| 43 | 0.0538 | −0.4738 |
| 44 | 0.0418 | −0.4949 |
| 45 | 0.0324 | −0.5112 |
| 46 | 0.0247 | −0.5244 |
| 47 | 0.0186 | −0.5344 |
| 48 | 0.0142 | −0.5412 |
| 49 | 0.0107 | −0.5464 |
| 50 | 0.0080 | −0.5500 |
| 51 | 0.0064 | −0.5522 |
| 52 | 0.0053 | −0.5534 |
| 53 | 0.0046 | −0.5542 |
| 54 | 0.0038 | −0.5550 |
| 55 | 0.0030 | −0.5557 |
| 56 | 0.0017 | −0.5567 |

In general, the airfoil 64, as described herein, has a combination of axial sweep and tangential lean. Depending on configuration, the lean and sweep angles sometimes vary by up to ±10° or more. In addition, the airfoil 64 is sometimes rotated with respect to a radial axis or a normal to the platform or shroud surface, for example by up to ±10° or more.

Novel aspects of the turbine blade and associated airfoil surfaces described herein are achieved by substantial conformance to specified geometries. Substantial conformance generally includes or may include a manufacturing tolerance of about ±0.050 inches (±1.27 mm), in order to account for variations in molding, cutting, shaping, surface finishing and other manufacturing processes, and to accommodate variability in coating thicknesses. This tolerance is generally constant or not scalable, and applies to each of the specified blade surfaces, regardless of size.

Substantial conformance is based on sets of points representing a three-dimensional surface with particular physical dimensions, for example in inches or millimeters, as determined by selecting particular values of the scaling parameters. A substantially conforming airfoil, blade or vane structure has surfaces that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

Although an example embodiment has been disclosed, a worker of ordinary skill in this art would recognize that certain modifications would come within the scope of the claims. For that reason, the following claims should be studied to determine their true scope and content.

What is claimed is:

1. A fan blade for a gas turbine engine comprising:
    an airfoil including leading and trailing edges joined by pressure and suction sides to provide an exterior airfoil surface extending in a radial direction to a tip; and
    wherein the external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

2. The fan blade according to claim 1, wherein the airfoil includes an aluminum fan blade.

3. The fan blade according to claim 1, wherein the span locations correspond to a position from a rotational axis of the airfoil in a numerical sequence indicated in Table 1 with the last position closest to the tip.

4. The fan blade according to claim 1, wherein the Cartesian coordinates in Table 1 have a tolerance relative to the specified coordinates of ±0.050 inches (±1.27 mm).

5. A gas turbine engine comprising:
    a compressor section;
    a combustor fluidly connected to the compressor section;
    a turbine section fluidly connected to the combustor, the turbine section comprising:
        a high pressure turbine coupled to the high pressure compressor via a shaft;
        a low pressure turbine; and
    a fan section operatively coupled to the turbine section, wherein the fan section includes an array of fan blades, wherein at least one fan blade includes an airfoil having leading and trailing edges joined by pressure and suction sides to provide an exterior airfoil surface extending from in a radial direction to a tip; and
    wherein the external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

6. The gas turbine engine according to claim 5, wherein the airfoil includes an aluminum fan blade.

7. The gas turbine engine according to claim 5, wherein the span locations correspond to a position from a rotational axis of the airfoil in a numerical sequence indicated in Table 1 with the last position closest to the tip.

8. The gas turbine engine according to claim 5, wherein the Cartesian coordinates in Table 1 have a tolerance relative to the specified coordinates of ±0.050 inches (±1.27 mm).

9. The gas turbine engine according to claim 5, wherein the array of fan blades includes less than about twenty-six (26) fan blades.

10. The gas turbine engine according to claim 5, wherein the array of fan blades includes less than about twenty (20) fan blades.

11. The gas turbine engine according to claim 5, wherein the fan section is driven by a geared architecture.

12. The gas turbine engine according to claim 5, wherein the gas turbine engine is a high-bypass geared gas turbine engine.

* * * * *